(12) United States Patent
Whittles et al.

(10) Patent No.: US 6,679,196 B1
(45) Date of Patent: Jan. 20, 2004

(54) BIRD FEEDING ACCESSORY WITH A COLLET

(75) Inventors: Christopher John Whittles, Shrewsbury (GB); Robert Kenneth Nock, West Midlands (GB)

(73) Assignee: C J Wildbird Foods Limited, Shrewsbury (GB)

( * ) Notice: Subject to any disclaimer, the term of this patent is extended or adjusted under 35 U.S.C. 154(b) by 0 days.

(21) Appl. No.: 10/208,742

(22) Filed: Aug. 1, 2002

(51) Int. Cl.$^7$ .................................................. A01K 5/00
(52) U.S. Cl. ...................................................... 119/51.01
(58) Field of Search ........................... 119/51.01, 52.2, 119/52.3, 57.8, 57.9, 57.91; 279/2.02, 2.03, 2.04

(56) References Cited

U.S. PATENT DOCUMENTS

| | | | | |
|---|---|---|---|---|
| 3,620,637 A | * | 11/1971 | George | 408/202 |
| 4,005,883 A | * | 2/1977 | Guest | 285/322 |
| 4,030,451 A | * | 6/1977 | Miller | 119/57.9 |
| 4,441,457 A | * | 4/1984 | Sanford | 119/57.9 |
| 4,858,938 A | * | 8/1989 | Terwilliger et al. | 279/57 |
| 5,279,187 A | * | 1/1994 | Salmon | 81/53.2 |
| 5,642,687 A | | 7/1997 | Nylen et al. | |
| 5,826,542 A | | 10/1998 | Allen et al. | |
| 6,098,348 A | | 8/2000 | Weaver | |
| 6,401,658 B1 | * | 6/2002 | Teets | 119/57.9 |

FOREIGN PATENT DOCUMENTS

GB 519917 4/1940

* cited by examiner

Primary Examiner—Yvonne Abbott
(74) Attorney, Agent, or Firm—Burns, Doane, Swecker & Mathis, L.L.P.

(57) ABSTRACT

A bird feeding accessory comprising a collet, having a collar with a threaded cap, the collar housing a resilient sleeve; wherein the threaded cap may be tightened around a variety of resilient sleeves, each sleeve being adapted to grip a rod of varying size by use of a slit in the sleeve and co-operating tapered sections in the collar and sleeve.

19 Claims, 5 Drawing Sheets

BIRD FEEDING ACCESSORY WITH A COLLET

FIELD OF INVENTION

This invention relates to bird feeding devices and/or associated accessories where the device and/or accessory has a collet for attaching it to a pole or rod.

BACKGROUND OF THE INVENTION

Bird feeding accessories, such as seed dispensers, bird feed trays and squirrel baffles are often supported above ground level by a rod, pole or similar means. There are no agreed standard diameters for such poles. This means that a particular accessory is normally sold complete with a pole to match. However, users of such equipment often desire to mount several accessories on a single pole. This may be visually more attractive and may also provide users with a better opportunity to observe birds feeding. Bird feeding accessories that are fixed to a pole by a collet are known, but these do not generally provide any means for accepting poles of different diameter. Consequently, it is advantageous to have a collet that can be adapted to accept various diameter poles.

In addition, pests such as squirrels tend to climb poles supporting bird feeding accessories; for example cylindrically shaped bird feed dispensers. It is known to provide a hood slidably mounted on a rod to prevent, or at least deter squirrels from stealing bird food. This arrangement is commonly called a squirrel baffle. Squirrel baffles are commonly fixed to a pole, the poles having a hook at each end. This allows the bird feeding accessory and baffle to be suspended from the branch of a tree. Typically, the squirrel feeder is attached to the lower hook of the rod. However, such a device is not suitable for use with bird feeding apparatus mounted on top of a pole. In addition most bird feeding apparatus have no means of saving seed that are dropped by the bird during feeding and normally fall to the ground Consequently, it is advantageous to be able to attach such baffles to poles that also support other bird feeding accessories. Such bird feeding apparatus is often suspended from the branch of a tree or supported on a pole standing in the ground; for example a bird feeder tray supported on top of the pole.

SUMMARY OF THE INVENTION

An object of the invention is to provide an improved collet for use as part of a bird feeding accessory.

It is another object of the present invention is to provide an improved collet for a bird feeder accessory that can act as both a baffle to deter unwanted animals taking bird feed and also act as a tray to catch bird feed that would otherwise fall to the ground.

According to one aspect of the invention there is provided a a bird feeding accessory having a collet; said collet comprising at least a main outer body and an insert member wherein said insert member may have a bore of varying size, adapted in use to engage a rod of varying diameter. Preferably, the insert member tapers outwardly near its upper end. The sleeve member has resilience so that it can, in use, readily grip a rod or pole. This resilience may be provided entirely or in part by at least one slot or slit in the insert member. The upper section of the sleeve may have an outwardly projecting rim. The outwardly projecting rim may have at least one slot in order to provide resilience.

In a first embodiment the invention comprises a collet having at least a main outer body and an insert member wherein said insert member may have a bore of varying size, adapted in use to engage a rod of varying diameter and the insert member is generally cylindrical in shape. The sleeve member may have an upper frustro-conical section. The upper section of the sleeve may have an outwardly projecting rim. The outwardly projecting rim may have at least one slot in order to provide resilience.

In a second embodiment the invention comprises a collet having at least a main outer body and an insert member wherein said insert member may have a bore of varying size, adapted in use to engage a rod of varying diameter and the insert member comprises an annular sleeve with a plurality of radial extensions that locate within the bore of the main outer body. The radial extensions may locate within the central bore of the collar, and may be generally rectangular in shape. There may be four radial extensions depending radially outwards from the central annular sleeve. Preferably, each quadrant has an upper section that tapers radially outwards In a third embodiment the invention comprises a squirrel baffle with a collet as described above, the collet being attached to a canopy. Preferably the canopy is formed in a generally hemispherical shape.

BRIEF DESCRIPTION OF THE DRAWINGS

Embodiments of the invention will now be described by way of example only, with reference to the following schematic drawings in which.

DETAILED DESCRIPTION OF THE DRAWINGS

Figure 1:
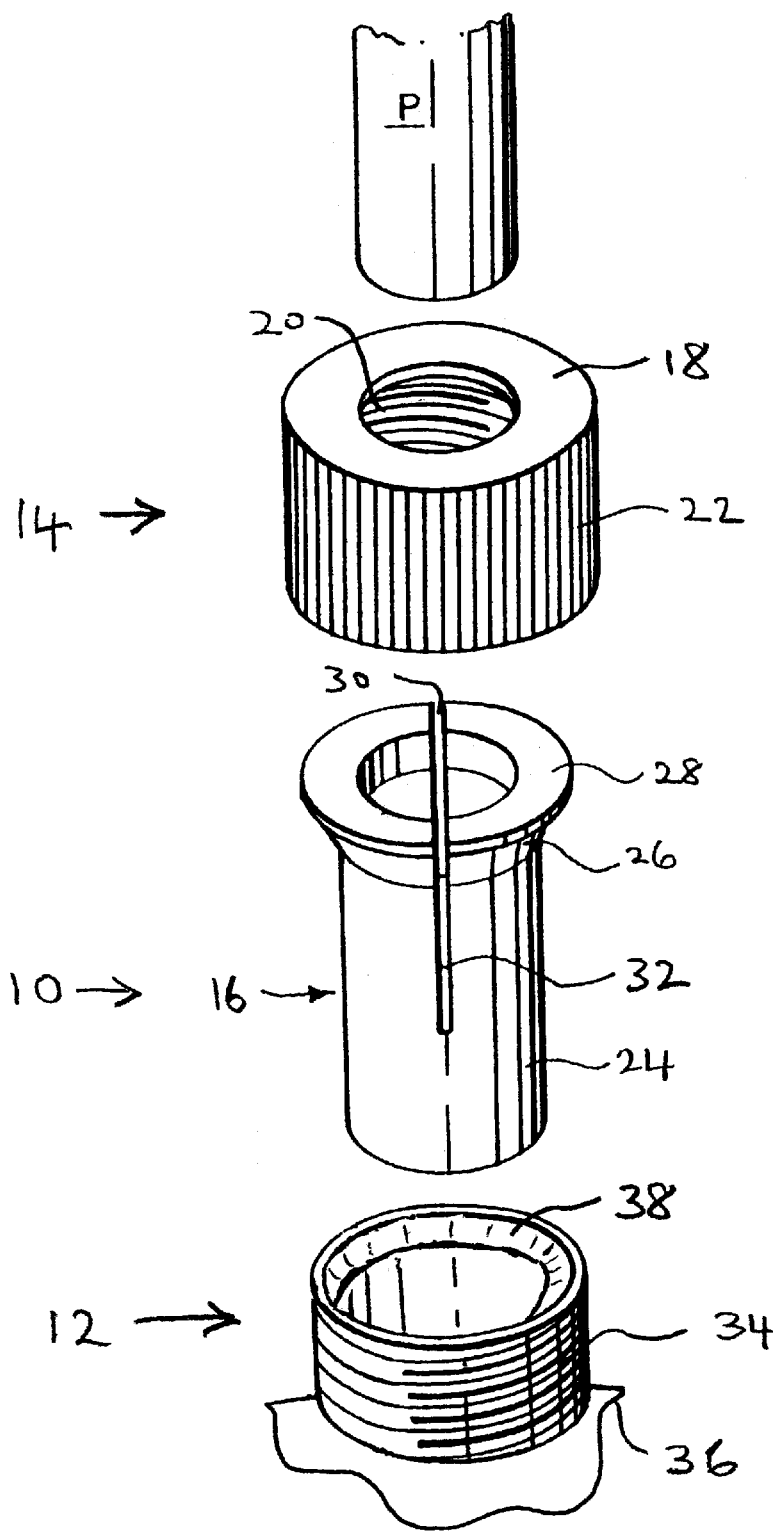
FIG. 1 is a perspective view in exploded form of a collet according to a first embodiment of the invention.

FIG. 1 shows a perspective view of a collet assembly 10 for a bird feeding accessory according to a first embodiment of the invention. The collet assembly 10 comprises a housing member, having a main outer body 12 and a cap 14, and an insert member 16.

The cap 14 is annular in cross section, has roof 18, that is annular in shape so that a pole P or rod R may be inserted through the centre of the roof and also the cap as a whole. On the inside walls of the cap 14 there is a female inner threaded portion 20 adapted to receive a male thread member (see below).

The insert member 16 comprises a sleeve 24 that is generally cylindrically shaped. A frustro-conical extension 26 extends from the upper end of sleeve 24; the sleeve 24 and frustro-conical extension 26 being of integral construction. Annular flange 28 extends radially inwardly and radially outwardly from the upper rim of cone 26. The sleeve 24, frustro-conical extension 26 and flange 28 are integrally formed and have a common bore, that may vary in size according to the size of rod R or pole P to be held by the collet. Flange 28 has radial slots 30 that are contiguous with slots 32 that extends longitudinally down the frustro-conical extension 26 and part way down the cylindrical sleeve 24. Insert member 12 is made of a resilient material such as polypropylene; the resilience of the insert member 12 is considerably increased by the ability of the two semicircular portions of cone 26 and flange 28 (formed by slits 30 and 32) to be pushed radially inwards by a suitable force (see below).

The main body member 12 comprises a generally cylindrically shaped sleeve dimensioned to allow the sleeve 10 to closely fit therewithin. The upper portion 34 of body member 12 has a male thread that engages the female thread 20 of cap 14. The upper end of the sleeve 34 houses a seat 38 that is dimensioned to engage the frustro-conical extension 26 of insert 10. The lower portion of sleeve 12 (not shown) extends below an interface region 36 that connects the collet 10 to a bird feeding accessory (not shown).

In use, the supporting pole P passes through the bores in the cap 14, insert member 16 and main outer body 12. Insert 16 is located within main outer body 12 and cap 16 is screwed onto male thread 34. Tightening the cap 14 on the thread 34 causes the outer surface of frustro-conical extension 26 to abut against seat 38. This produces a force upon the sleeve 16 that acts in a radially inwardly direction. Thus the resilience of the sleeve 16 allows the upper portions thereof to be pushed radially inwardly and grip the pole P. Poles P of varying diameter can be accommodated by replacing insert member 16 with another insert having a different diameter bore. If necessary, the cap 14 may also be replaced with a cap having a larger bore.

Figure 2:
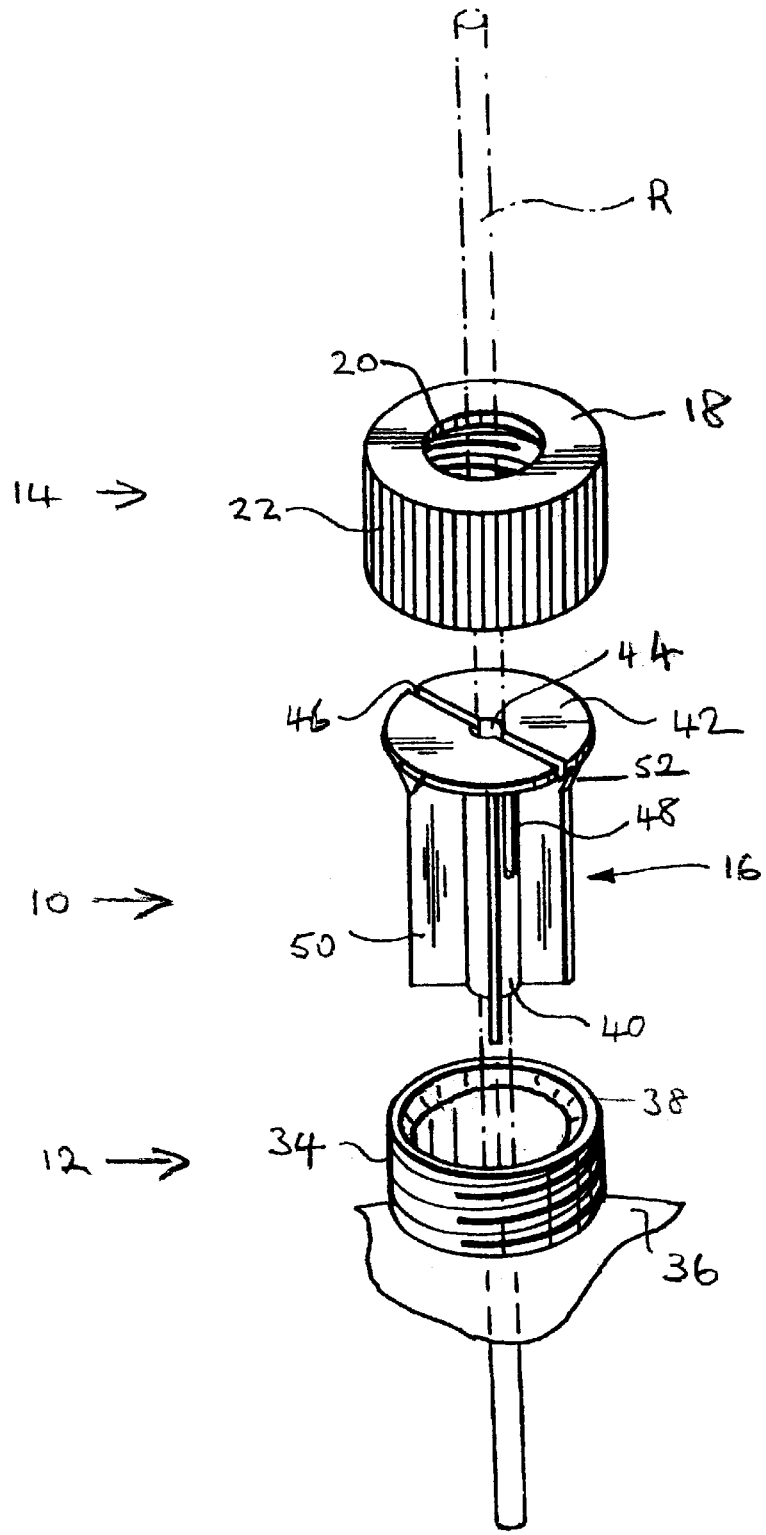
FIG. 2 is a perspective view in exploded form of a collet according to a second embodiment of the invention.
Figure 3:
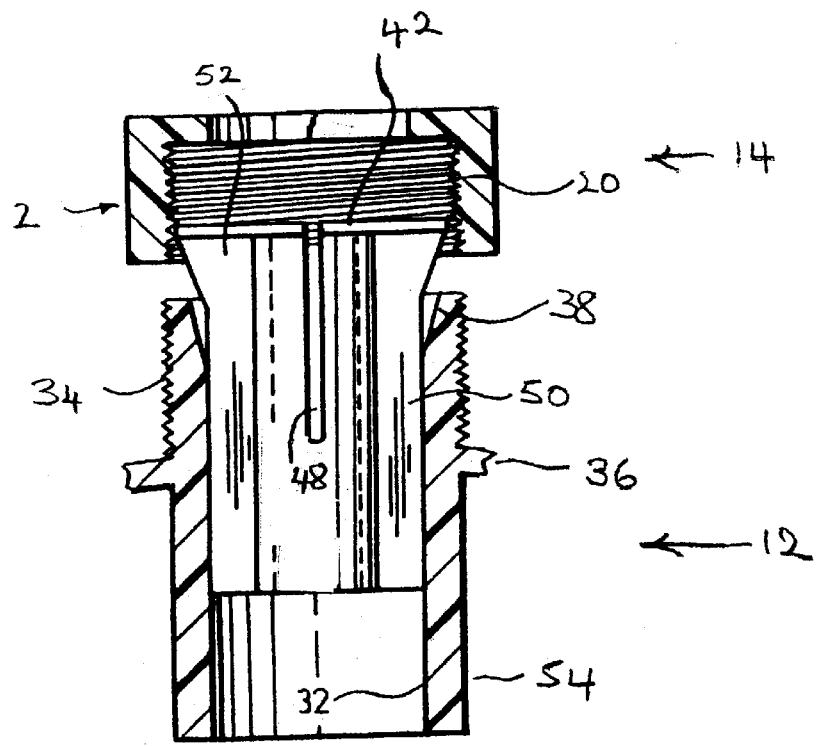
FIG. 3 is a sectioned side view of the collet shown in FIG. 2.

FIG. 2 shows a perspective view of a collet assembly 10 for a bird feeding accessory according to a second embodiment of the invention. The collet assembly 10 again comprises a housing member, having a main outer body 12 and a cap 14, and an insert member 16. The cap 14 is again annular in cross section, has an annular shaped roof 18, and a female inner threaded portion 20 adapted to receive a male thread member (see below).

The insert member 16 comprises a rod sleeve 40 and an upper flange 42 that extends radially outwardly from the upper rim of rod sleeve 40. Rod sleeve 40 and upper flange 42 have a common a bore 44 that may vary in size according to the size of rod R or pole P to be held by the collet. The upper flange 42 has a diametric slot 46 that is contiguous with additional slots 48 that extend longitudinally part way down the cylindrical rod sleeve 40. Insert member 16 is made of a resilient material such as polypropylene, and the resilience of member 16 is considerably increased by the ability of the diametric slot 46 and longitudinal slots 48 to be pushed radially inwards by a suitable force. (see below). The rod sleeve has a plurality of quadrants 50 that depend radially outwards therefrom. The upper end of each quadrant 50 has an outwardly tapering portion 52. Rod sleeve 40, flange 42 and quadrants 50, 52 preferably form an integral structure. Rods R or poles P of varying diameter can be accommodated by replacing insert member 16 with another insert having a different diameter bore. If necessary, the cap 14 may also be replaced with a cap having a larger bore.

The main body member 12 comprises a generally cylindrically shaped sleeve dimensioned to allow the sleeve 10 to closely fit therewithin. The upper portion 34 of body member 12 has a male thread that engages the female thread 20 of cap 14. The upper end of the sleeve 34 houses a seat 76 that is dimensioned to engage the tapered upper portion 52 of the quadrants 50 of insert 10. The lower portion 54 of sleeve 12 extends below an interface region 36 that connects the collet 10 to a bird feeding accessory (not shown).

In use, rod R passes through the bores in the cap 14, insert member 16 and main outer body 12. Insert 16 is located within main outer body 12 and cap 16 is screwed onto male thread 34. Tightening the cap 14 on the thread 34 causes the tapered upper portions 52 of the quadrants 50 to abut against seat 38. This produces a force upon the sleeve 16 that acts in a radially inwardly direction. Thus the resilience of the sleeve 16 allows the upper portions thereof to be pushed radially inwardly and grip the pole P. Poles P of varying diameter can be accommodated by replacing insert member 16 with another insert having a different diameter bore 44. If necessary, the cap 14 may also be replaced with a cap having a larger bore.

Figure 4:
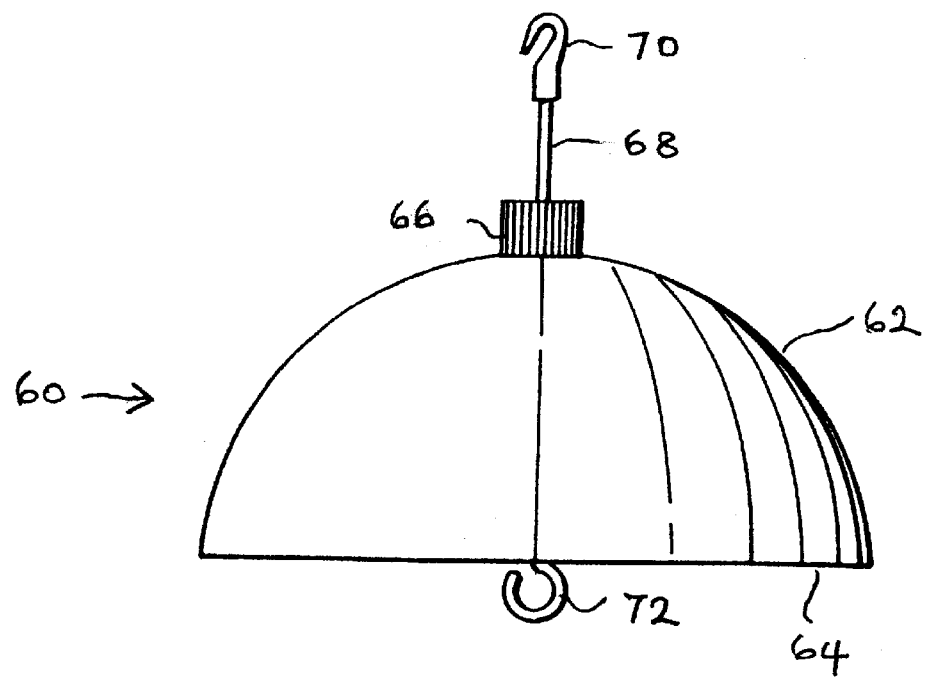
FIG. 4 is a side view of a bird feeding accessory according to a third embodiment of the invention.
Figure 5:
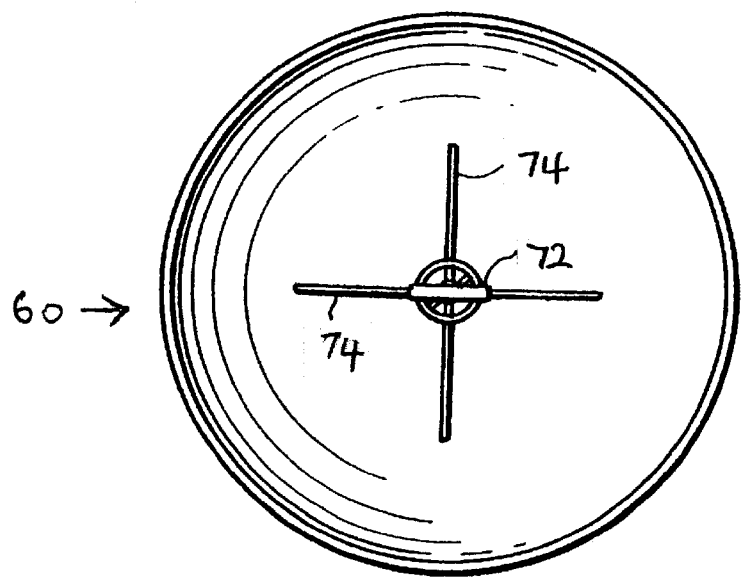
FIG. 5 is an underside view of the bird feeding accessory of FIG. 4.
Figure 6:
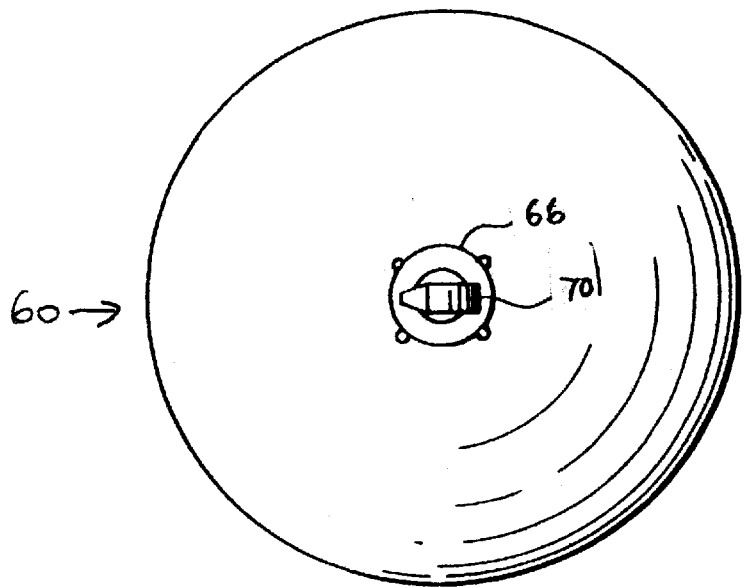
FIG. 6 is a plan view of the bird feeding accessory of FIG. 4.
Figure 7:
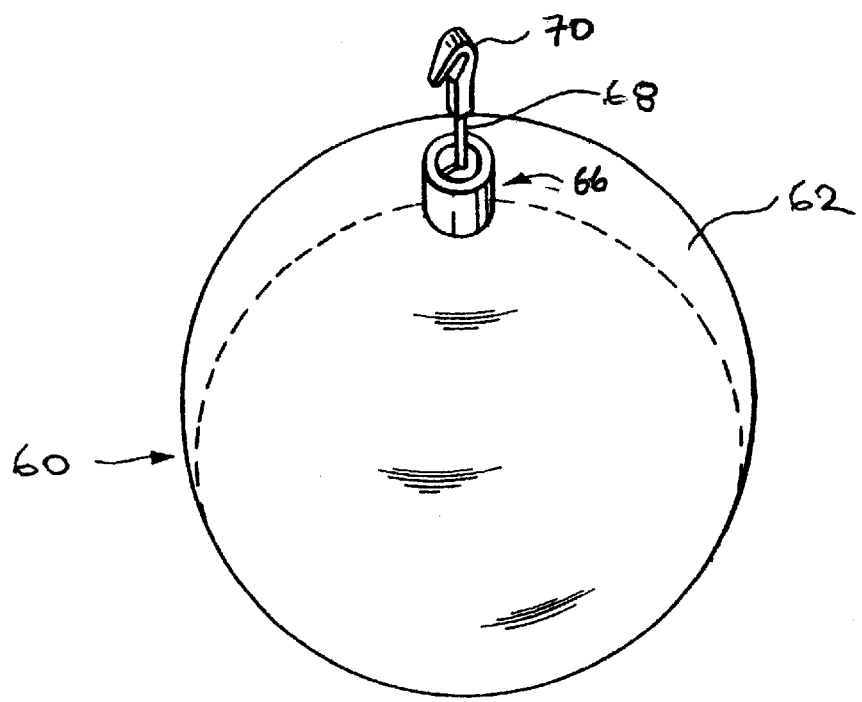
FIG. 7 is a perspective view of the bird feeding accessory of FIG. 4.

FIGS. 4 to 7 shows views of a bird feeding accessory 60 according to a third embodiment of the invention. The squirrel baffle 60 comprises a hemi-spherical shell or canopy 62 with rim 64, and a collet (as described above) 66 located equidistantly from rim 64. Collet 66 is adapted to receive rods or poles of varying diameter, according to the type of sleeve inserted within. FIG. 4 shows a rod 68 connected at one end to an upper hook 70 and connected at the other end to a lower hook 72. Hooks 70 and 72 are detachably connected to rod 68 by means of threaded portions (not shown) at the extremities of the rod 68 and bores with corresponding female threads in the hooks 70 and 72 (not shown). This facilitates removal of the rod with its hooks from a canopy to allow replacement by a pole. Canopy 62 has strengthening ribs 74 that extend downwardly in a longitudinal direction along the inner surface of the canopy from collet 66, the strengthening ribs 74 extending in mutually orthogonal directions as viewed from above (see FIG. 5).

In use, the squirrel baffle 60 may be suspended from the branch of a tree, for example by connecting upper hook 70 by string to the branch, and then a bird feeder, typically a cylindrical type as described above, may be suspended below the accessory using lower hook 72 connected by rod 68 to upper hook 70. Alternatively, the accessory may be used in the same form as a food catcher by inverting the canopy, typically suspending under a bird feeder using hook 72 to connect the accessory to the bird feeder.

Conversion of the apparatus from rod and hook form to pole form simply requires removal of cap 18, removal of a hook (70 or 72) from rod 68, removal of the rod 68 and insert member 10, replacement of insert 10 by a larger bore insert 10 and refitting of cap 14. The apparatus is then ready to accept a pole P through the collet assembly.

Bird feeders are frequently mounted on poles in the ground. In use the bird feeding accessory of the present invention may be mounted above such a feeder on a pole to act as a baffle or below such a feeder on the pole to act as a food catcher.

The collet according to the invention may of course use a pole or the like that is not circular: for example the pole may have an elliptical, rectangular, hexagonal or an octagonal section. In the invention according to the first embodiment longitudinal slot 32 need not extend beyond the frustro-conical extension 26. Likewise, in the second embodiment the diametric slot 46 may be replaced by at least one radial slot, as may longitudinal slot 48. Further, in this embodiment it is not essential that there are four quadrant members; however, there should be at least one, and preferably two or more. Naturally, the seat 38 and frustro-cone 26 or tapered quadrant section 52 may be replaced with equivalent abutment surfaces that result in a inwardly directed force being applied to the insert as it is tightened in place by fixing means 18.

The first embodiment has an insert that is particularly suited for use with poles, while the second embodiment has an insert that is particularly suited for use with rods. Advantageously, by swapping insert types the collet may be readily converted from use with a pole to use with a rod or vice-versa.

We claim:

1. A bird feeding accessory having a collet; said collet comprising at least a main outer body and an insert member wherein said insert member may have a bore of varying size, adapted in use to engage a rod of varying diameter.

2. A bird feeding accessory according to claim 1 wherein the insert member is dimensioned to closely fit within the housing.

3. A bird feeding accessory according to claim 1 wherein the main outer body is adapted to accept a substantially cylindrically shaped insert member.

4. A bird feeding accessory according to claim 3 wherein the insert member is substantially cylindrical in shape.

5. A bird feeding accessory according to claim 4 wherein the insert member tapers outwardly near its upper end.

6. A bird feeding accessory according to claim 5 wherein the insert member has an upper section that is frustro-conical in shape.

7. A bird feeding accessory according to claim 1 wherein the insert member comprises an annular sleeve with a plurality of radial extensions that locate within the bore of the main outer body.

8. A bird feeding accessory according to claim 7 wherein the radial extensions comprise outwardly depending quadrants.

9. A bird feeding accessory according to claim 7 comprising three, four or five radial extensions.

10. A bird feeding according to claim 1 wherein the upper end of the insert member has an outwardly projecting rim or flange.

11. A bird feeding accessory according to claim 10 wherein the rim or flange has at least one radial slit to provide the said resilience.

12. A bird feeding accessory according to claim 1 wherein the insert member has resilience.

13. A bird feeding accessory according to claim 12 wherein the insert member comprises at least one longitudinal slit to provide the said resilience.

14. A bird feeding accessory according to claim 13 where the cap threadingly engages the body.

15. A bird feeding accessory according to claim 1 wherein the main outer body comprises a cap and body where the cap lockingly engages the body.

16. A bird feeding accessory comprising a canopy with a collet housing a removable resilient member adapted to accept inserts of varying size within the collar wherein the resilient member grips the insert upon rotation of a threaded cap engaging the collar.

17. A bird feeding accessory according to claim 16 wherein the canopy is formed in a generally hemispherical shape.

18. A bird feeding accessory according to claim 17 wherein the canopy is formed in a generally hemispherical shape.

19. A bird feeding accessory according to claim 1 comprising squirrel baffle having a canopy.

* * * * *